low finesse etalon

INVENTORS T. J. BRIDGES
W. W. RIGROD
BY Wilford L. Wisner
ATTORNEY

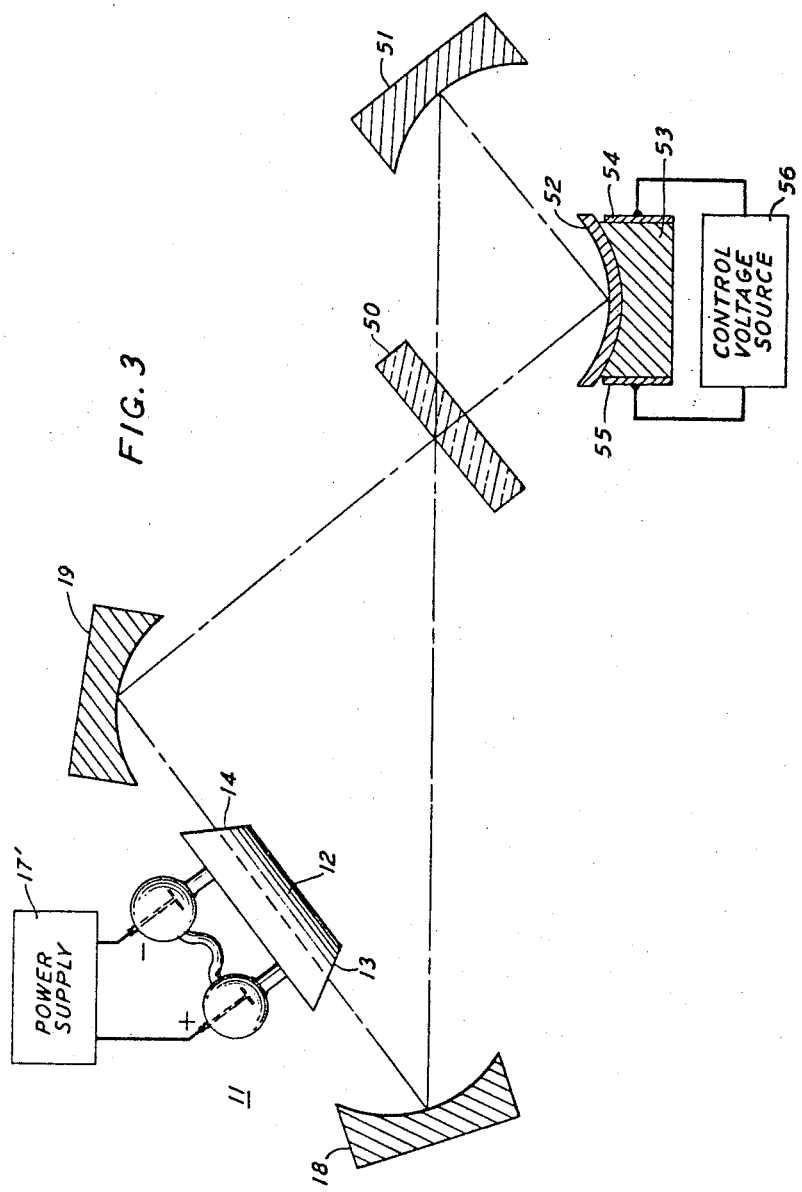

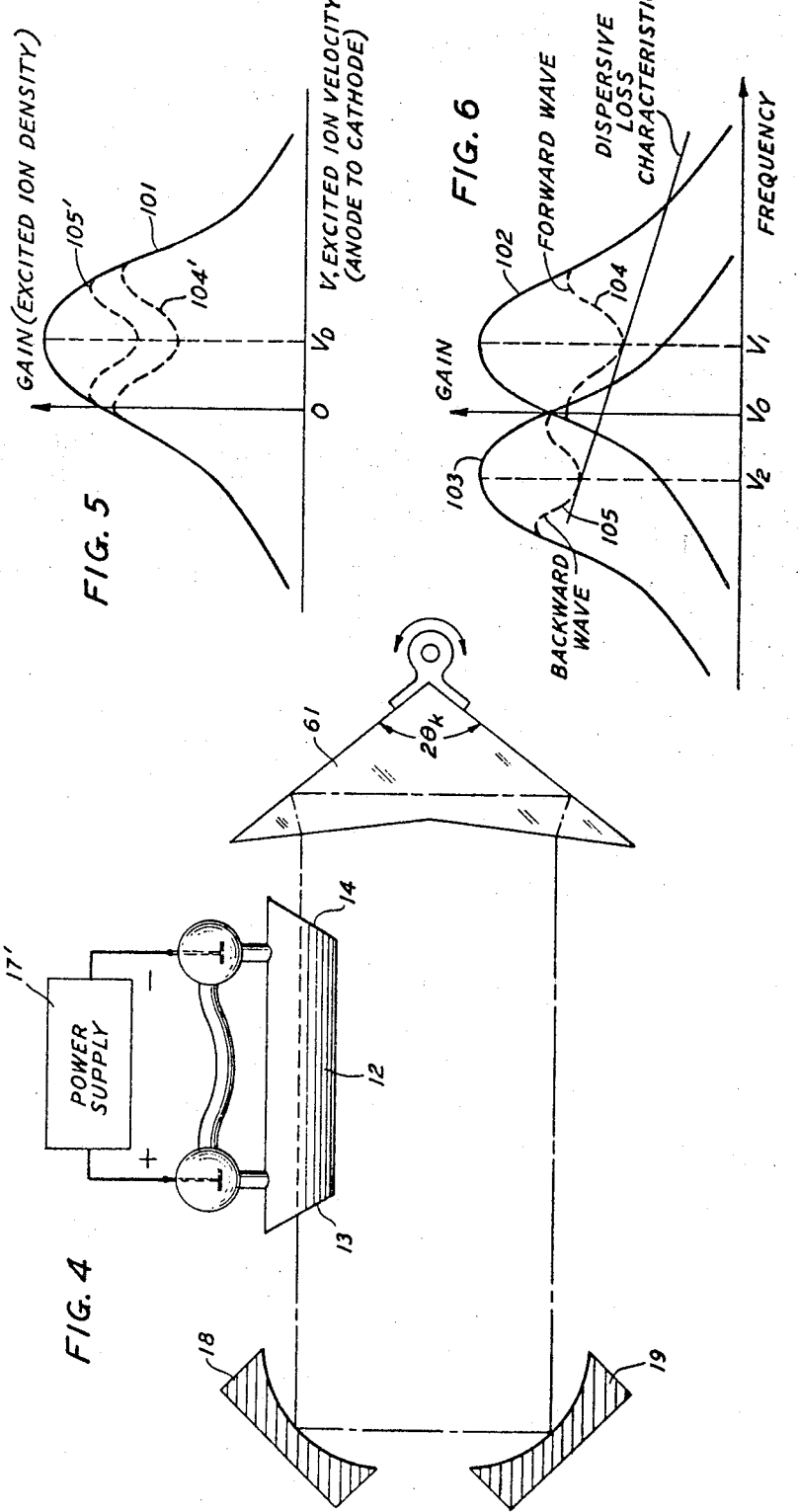

3,414,839
UNIDIRECTIONAL RING LASER

Thomas J. Bridges, Bernardsville, and William W. Rigrod, Millington, N.J., assignors to Bell Telephone Laboratories, Incorporated, New York, N.Y., a corporation of New York Filed June 18, 1965, Ser. No. 465,136
8 Claims. (Cl. 331—94.5)

This invention relates to apparatus for the stimulated emission of radiation, particularly the type including an optical ring resonator.

Stimulated radiation apparatus including a ring resonator is generally called a ring laser for the sake of brevity. Although most applications of ring lasers proposed hitherto involve the interaction of two oppositely-directed circulatory light beams in the same ring resonator, a unidirectional traveling-wave ring laser is frequently desirable.

For example, in high-power applications, the total output power should be maximized. In the bidirectional ring laser, interference between oppositely directed waves produces a moving, spatially periodic variation of field intensity that does not deplete as much of the available inverted population, i.e., does not exhaust the available power as fully as an equivalent spectrum of unidirectional waves. Note that this power limitation in a bidirectional laser exists whether or not the two oppositely-directed beams can be fully utilized simultaneously. If only one of the two beams can be used in any event, the useful power output can be substantially more than doubled if a unidirectional traveling wave can be efficiently obtained within the ring laser.

As a further example, previous experiments with a ruby ring laser have shown that a unidirectional traveling-wave ring laser is inherently more stable than one that oscillates in two directions simultaneously and also is freer of random spiking. These experiments utilized a Faraday rotation isolator to obtain the unidirectional traveling wave; such an arrangement is neither as efficient nor as simple as would be desirable in commercial apparatus.

A third area of interest involves gaseous ion lasers, from which it is desired to produce a relatively high power output with a high degree of spectral purity. When the gain of the laser medium is anisotropic, as in the ion laser, the bandwidth available for bidirectional oscillations through the active material is greater than the bandwidth for light passing through the active material in only one direction. The unidirectional traveling-wave ion ring laser can compress the available power into a smaller band, thereby increasing the ease and efficiency with which a single frequency in a single mode can be obtained from the ion laser.

A fourth area of application of a unidirectional traveling-wave ring laser involves frequency-shifting or modulating devices, such as acoustically responsive devices that are inserted within the optical ring resonator. A unidirectional traveling wave within the ring resonator will enable all the available power to be contained in a single sideband, as is desirable for most communication purposes, whereas the bidirectional ring laser wastes half the available power on the other sideband.

In addition to the Faraday rotation isolator, another technique that has been used to obtain a unidirectional traveling wave in a ring laser involves the variation of the optical path length to tune the cavity frequencies such that oppositely directed waves of different frequency coincide closely with the same Doppler-shifted atomic resonance, so that completion effects tend to extinguish one or the other wave. This method, however, produces a unidirectional traveling wave having a direction that is neither predictable, as either direction of propagation may be initiated on a chance basis, nor as stable as would be desired in a commercial apparatus, since a chance disturbance could switch the direction of the unidirectional traveling wave.

An object of our invention is the stable and predictable provision and control of unidirectional traveling waves in a ring laser.

Accordingly, our invention resides in the discovery that a unidirectional traveling wave can be obtained in a ring laser having a gain characteristic that is anisotropic with respect to direction by introducing a tunable dispersive loss device into the ring resonator. This tunable loss device will typically provide the same loss in either direction for a given frequency, but different losses for different frequencies.

More specifically, the anisotropic gain characteristic is typically provided by the active material of the laser, as in an ion laser. Nevertheless, in other lasers such as neutral-gas lasers, the gain anisotropy can be provided by an anisotropic device within or coupled to the ring resonator. The tunable dispersive loss can take many forms and, in the various specific embodiments to be described, involves an etalon interposed at nearly normal incidence in the beam path, a prism-and-aperture arrangement, another ring resonator loosely coupled to the resonator of the laser, and an internal reflection prism adapted to reflect light at angles very close to the critical angle.

A ring laser according to the invention is effective not only when the gain-frequency profiles for the opposite directions in the absence of the isotropic dispersive loss do not overlap at levels above oscillation threshold, but also when there is partial overlap of those profiles at levels above the oscillator threshold. A tentative theory directed to explaining this experimentally observed phenomenon will be offered hereinafter.

The invention is useful for both oscillations and regenerative amplifiers; and in the latter application it provides a variety of advantages over other alternatives. These include the capability of reversing the direction of traveling wave propagation stably and predictably in response to a relatively small control signal.

A more detailed understanding of the invention may be obtained from the following detailed description in conjunction with the drawing, in which:

FIG. 3 is a partially pictorial and partially schematic showing of an embodiment of the invention employing another ring resonator loosely coupled to the resonator of the laser;

FIG. 4 is a partially pictorial and partially schematic showing of an embodiment of the invention employing an internal reflection prism adapted to reflect light at angles very close to the critical angle; and FIGS. 5 and 6 show curves that are helpful in understanding the theory and operation of the invention.

The principles of the invention may best be explained by reference to one of the many specific embodiments.

Figure 1:
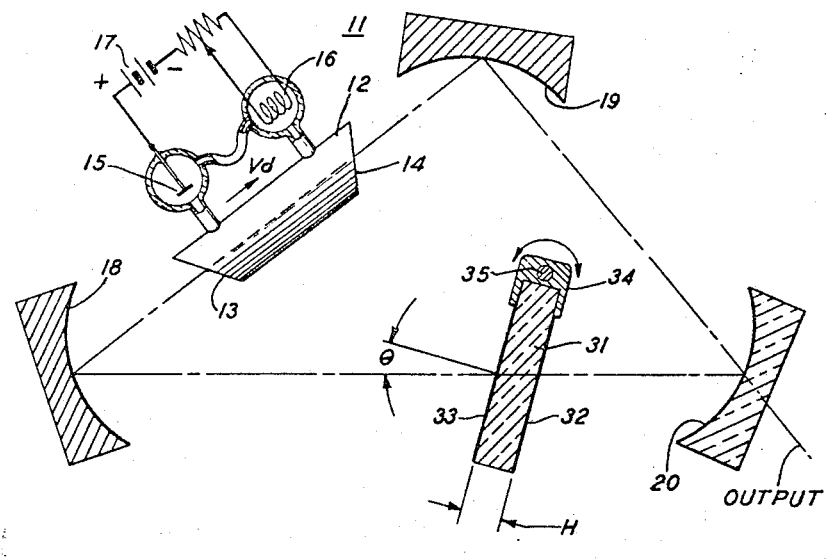
FIG. 1 is a partially pictorial and partially schematic showing of an embodiment of the invention employing an etalon disposed in the beam path.

In FIG. 1, a specific embodiment of the invention comprises the active element 11, and the optical ring resonator including the appropriately disposed reflecting elements 18, 19 and 20. The active element 11 includes a tube 12 containing an active material such as argon and having Brewster angle end windows 13 and 14 and an extication power source 17 connected between anode 15 and cathode 16 in tube 12. Tube 12 is formed so that the argon gas may circulate freely between anode 15 and cathode 16, but so that the stimulated emission of radiation can occur only along the axis passing through end windows 13 and 14.

In order to maintain the gain anisotropy that is one requirement of the present invention, the argon gas within tube 12 is preferably maintained substantially ionized. In the specific illustrative embodiment of FIG. 1, another element of the instant embodiment of the invention is provided by the so-called etalon 31, which is a parallelepiped of a crystalline material such as quartz having a dispersive light-transmission characteristic. Etalon 31 is disposed at nearly normal, or slightly oblique, incidence within the beam path of the optical ring resonator. That is the transmissivity of crystal 31 varies with radiation frequency for the range of frequencies provided by active element 11; and the normal to the parallel faces 32 and 33 forms a small angle $\theta$ with respect to the beam path, where $\theta$ is any one of a plurality of discrete angles less than about ten degrees.

Active element 11 preferably is the active portion of an argon ion laser of the type disclosed in the copending application of E. I. Gordon et al., Ser. No. 385,159, filed July 27, 1964 and assigned to the assignee hereof; and may be provided with means for increasing the discharge current and power output as disclosed in the copending application of E. I. Gordon et al., Ser. No. 439,657 filed Mar. 15, 1965 and also assigned to the assignee hereof. A substantial discharge current in the indicated polarity is illustratively provided by a D.C. power source 17 in order to maintain the argon gas substantially ionized.

Reflectors 18, 19 and 20 are bicylindrically curved, or astigmatic, mirrors adapted to focus the beam at oblique incidence and to maintain a substantially circular cross section of the beam for maximum efficiency. To this end, they may be fabricated as described in the concurrently filed application of W. W. Rigrod, Ser. No. 465,135 assigned to the assignee hereof. It should be understood that any one or all of reflectors 18, 19 and 20 could be flat, or they could be spherically curved if appropriate bicylindrically curved correcting lenses were employed in association therewith. Moreover, high laser efficiency and a circular shape of the beam cross section are not essential to the invention, even though we consider them to be preferable. Illustratively, reflector 20 may be partially transmissive to permit an output beam to be abstracted.

Etalon 31 is illustratively a fused quartz body with highly polished parallel sides 32 and 33. The angle $\theta$ between the normal to sides 32 and 33 corresponds to one of the transmittance maxima of the etalon 31 for a frequency of interest within the pertinent emission line of laser 11. As will be explained more fully hereafter, these transmittance maxima occur for waves propagating first in one direction and then in the opposite direction as $\theta$ is varied. It should be clear that etalon 31 could also consist of other optical materials providing a sufficient variation of optical loss or optical transmittance with respect to frequency in the frequency range of interest.

The operation of the invention may be understood from the following theoretical explanation.

Active element 11 has a gain spectrum that is anisotropic; that is, the gain at one frequency in one direction will be different from the gain at the same frequency in the opposite direction. This phenomenon is, in this illustrative example, a result of the drift of the positive argon ions from anode 15 to cathode 16 within the region of tube 12 in which the stimulated emission of radiation occurs. Associated with these drifting positive ions is the excited pair of energy levels from which the emission of coherent radiation can be stimulated; and the momenta of these ions provide corresponding Doppler shifts in the frequency of the emitted radiation. Radiation in the direction of motion is shifted upward in frequency; and radiation against the direction of motion is shifted downward in frequency. That is, when an excited particle (atom, ion or molecule) emits radiation in a transition between energy levels $$E_2 - E_1 = h\nu_0 \qquad (1)$$

where $E_2$ and $E_1$ are respectively the upper and lower of the optically connected energy levels, $h$ is Planck's constant, and $\nu_0$ is the atomic resonance frequency corresponding to the optically connected levels, the radiation emitted along the direction of particle motion at velocity $V$ is Doppler-shifted to a frequency $$\nu_1 = \nu_0 \left( 1 + \frac{V}{c} \right) \qquad (2)$$

and that emitted in the opposite direction is down-shifted to a frequency $$\nu_2 = \nu_0 \left( 1 - \frac{V}{c} \right) \qquad (3)$$

because of the radiation reaction to the momentum of the moving particle.

However, it is necessary also to take into account the variation or distribution of ion drift velocities with the gas. The active particles in ion lasers, or flowing-gas lasers generally, have a velocity distribution along the axis of the laser consisting of a drift velocity, $V_d$, superimposed upon a nearly Maxwellian velocity distribution characteristic of a hot gas in thermal equilibrium. Such a velocity distribution is shown by curve 101 in FIG. 5, which describes gain, or inverted population density of excited ions as a function of excited ion velocity. It will be noted that the peak of the gain curve is offset from the zero-velocity axis by the amount of the average drift $V_d$. Implicit in this curve is the relationship that the unsaturated power gain for any particular wave is proportional to the number density of active particles that can contribute energy to that wave.

The gain-frequency spectra for waves propagating in opposite directions along the laser axis may be derived from curve 101 and Equations 2 and 3 above and are illustrated by curves 102 and 103 in FIG. 6. It may be noted that, for one direction of propagation (curve 102), the peak of the gain curve occurs at frequency $\nu_1$ that is higher than $\nu_0$. For the other direction of propagation (curve 103), the peak of the gain curve occurs at a frequency $\nu_2$ that is as far below $\nu_0$ as $\nu_1$ is above.

Either direction may, of course, be chosen as preferred; and the choice may be changed merely by changing the angle $\theta$ of etalon 31. Etalon 31 provides that the excess of gain over loss in a broad frequency region centered about the gain peak of the preferred wave (i.e., that described by curve 102) is made slightly greater than the excess of gain over loss in another frequency region centered about the gain peak of the oppositely directed wave (i.e., that described by curve 103). In general, an excess of gain over loss will exist for a plurality of different frequencies for each direction of propagation; and a plurality of different waves or oscillations will tend to propagate in each direction. The intensity of each such wave is directly related to the excess of available gain over loss at its frequency. When the "hole widths" (dotted curve 104 or 105 in FIG. 5) which can be burned in the gain curves by either $\nu_1$ or $\nu_2$ are comparable to the mode spacing in terms of ion velocity, the oppositely directed waves will inevitably compete with each other for the available energy of excited ions in the same velocity class. In fact, in the situation illustrated, the optical ring resonator is tuned so that the holes are centered at the peaks of their respective gain-frequency curves and thus are almost completely overlapping in terms of the atom velocity classes from which the existing waves draw their energy. As the gain available to the weaker waves propagating in the direction of higher loss is reduced by the stronger waves propagating in the direction of lower loss, the process becomes so strongly unbalanced that the weaker waves propagating in the higher loss direction are quickly extinguished.

The dispersive loss of etalon 31 establishes a preference for one group of frequencies over another; and therefore, for waves in one direction over waves in the other direction, as may be appreciated by examining curves 102 and 103.

The embodiment of FIG. 1 has been successfully employed when the tuning of the ring resonator as affected by the variation in optical path length provided by etalon 31 was such as to promote either no overlapping or substantial overlapping of the gain profiles for the two opposite directions. A small degree of profile overlap is illustrated by dotted curves 104 and 105 in FIG. 6. In every case, the selection of direction among all of these oppositely directed waves is experimentally the same as the selection of direction provided by etalon 31 for the waves of nonoverlapping frequency. No chance variation from this rule of unidirectionality of the surviving waves has been observed.

Without wishing to limit the invention, we wish to suggest that the following theoretical considerations are relevant to this phenomenon. It will be noted that a dispersive loss element in the ring resonator which provides greater net gain for higher frequencies will favor forward waves such as $\nu_1$ of FIG. 6, which lie in the nonoverlapping portion of the forward-gain profile. Such an element might be thought to favor backward waves such as $\nu_0$ in the overlapping region of the two gain profiles. However, experiment has revealed that frequencies in the overlap region will oscillate in the same direction as the stronger waves in the nonoverlap region. A contrary behavior would result in a number of standing waves, due to the interference between waves of the same frequency in opposite directions. Standing waves are a less efficient field configuration than are traveling waves, for extracting the maximum amount of power from a laser, inasmuch as they cause the laser gain to saturate sooner. Inasmuch as the laser always operates in its most efficient mode, the oscillations will occur in the form of traveling waves at different frequencies, rather than standing waves at the same frequency. For this reason all of the oscillations are in the same direction, including those in the overlap region.

In any event, it can be shown that successive transmittance maxima of etalon 31 occur alternately for the respective directions for successive values of $\theta$ determined from the following relationship:

$$\theta^2 = 2n^2 \left[ 1 - \frac{m\lambda}{2nH} \right] \quad (4)$$

where $n$ is the refractive index of etalon 31, $H$ is its thickness, $\lambda$ is the wavelength of the transmitted radiation, and $m$ is a positive integer. For large $\theta$, it is difficult to maintain a sufficiently accurate and stable optical loss or transmittance. Preferably $\theta$ is less than a few degrees, i.e., 5° for a quartz etalon 31, and in general less than 10° for other likely materials, such as glass or other transparent solid.

Correspondingly, the change in $\theta^2$ between successive maxima of transmittance is given by $$\frac{\delta\theta^2}{\delta m} = -\frac{n\lambda}{H} \quad (5)$$

These relationships have been experimentally verified; and it has been shown that the selection is predictable and is not dependent on path length variations.

Various modifications of the embodiment of FIG. 1 can be made.

First, active element 11 could be replaced with any other active material having gain anisotropy or with an isotropic laser coupled with an anisotropic absorption cell. Anisotropy appears to be characteristic of all ion lasers, CW or pulsed, that are activated by a D.C. discharge and is also characteristic of any neutral atomic or molecular gas laser, excited in any fashion when the atoms or molecules are caused to flow through the laser tube with an appreciable average velocity.

An anisotropic absorption cell suitable for use in conjunction with an isotropic active material such as a static helium-neon gas mixture is an absorption cell containing neon subjected to a discharge and caused to flow at an appreciable average velocity. Moreover, the discharge could be increased until gain is provided. Similar principles are applicable for other isotropic active materials.

Furthermore, gain anisotropy can be provided by the Stark, Zeeman, pressure or some collision effect in addition to the Doppler effect. For example, see Resonance Radiation and Excited Atoms, by A. C. G. Mitchell et al., Cambridge University Press, 1934, at pp. 174 and 180, or the appropriate portions of the books Atomic Spectra by H. G. Kuhn, Academic Press, N.Y. (1963), or Shift and Shaped Spectral Lines, by R. G. Breene, Pergamon Press, N.Y. (1961). An appropriate component for producing such an effect might thus be used with a laser in accordance with the present invention.

Figure 1A:
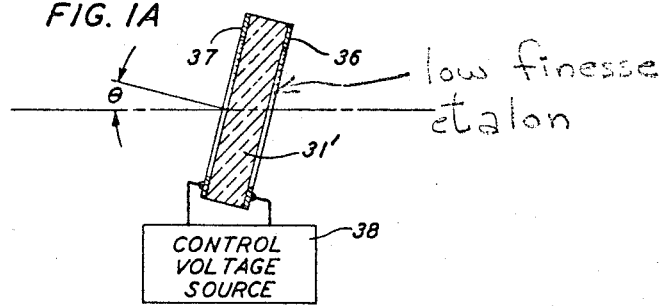
FIG. 1A is a partially pictorial and partially schematic showing of a modification of the etalon in FIG. 1.

Second, although the variation of the optical transmittance in the embodiment is illustratively accomplished by mounting etalon 31 in the mounting bracket 34, which turns about a fixed pivot 35 to vary $\theta$, the variation in transmittance may advantageously be accomplished by electrical means. For example, in FIG. 1A, the polished, low-finesse etalon 31 is crystalline quartz suitably cut and polished to act as a piezoelectric element. Its optical transmissivity is varied by means of a voltage source 38 connected between two annular electrodes 36 and 37 attached to opposite faces of the crystal 31. This voltage permits compensation for thermal changes in the etalon thickness, as well as rapid switching of the direction of oscillations at a rate limited by the relaxation mechanism of laser 11.

Figure 2:
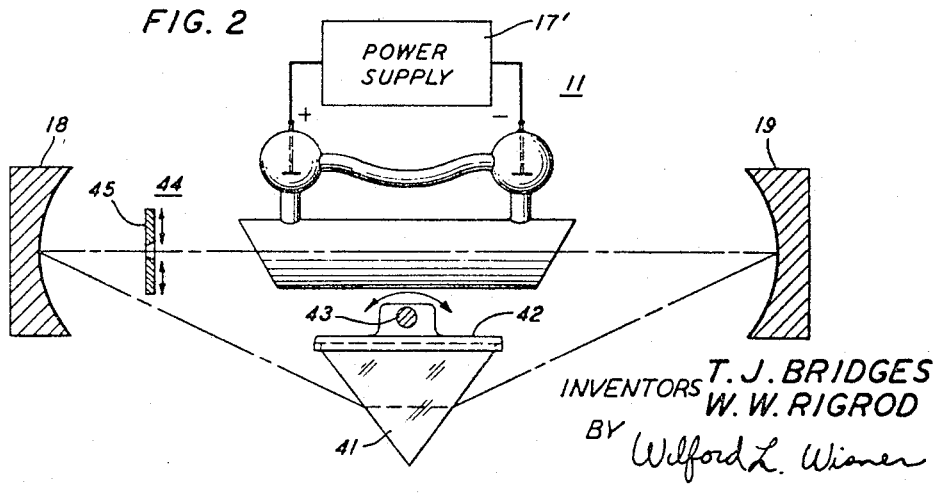
FIG. 2 is a partially pictorial and partially schematic showing of an embodiment of the invention employing a prism-and-aperture arrangement.

An alternative mechanism and arrangement for providing a highly dispersive loss is illustrated in FIG. 2.

Active element 11 is illustratively the same as described in connection with FIG. 1. The triangular quartz prism 41 provides sufficient refraction for all frequencies so that only two reflectors 18 and 19 are required to complete the optical ring resonator. A variable iris 44 is disposed so that the aperture between its blades 45 is in line with the beam path. Preferably, the dimension of the aperture in the plane of the ring can be varied mechanically or electrically, by means not shown. The tuning of prism 41 can be varied by rotating its base mounting 42 about the fixed pivot 43.

As is well known, differing frequencies of radiation will be refracted by differing amounts in prism 41. Thus, a circuitous optical path will be closed through the aperture of iris 44 for a frequency or wavelength that is dependent upon the orientation of prism 41. The beam deviation and the diffraction loss due to the aperture is also a function of wavelength.

In operation, one competition has been initiated between differing frequencies propagating in opposite directions around the ring, the sensitive frequency preference provided by prism 41 and aperture 44 causes the competition to become progressively more unstable until all existing waves propagate only in the original direction of the preferred frequency. It is advantageous in some applications that iris 44 provides a sharp discontinuity in the dispersive loss. The arrangement is quite sensitive but is somewhat more critical of adjustment than that of FIG. 1.

In FIG. 3, a further alternative dispersive loss mechanism and arrangement for modifying the embodiment of FIG. 1, comprises a secondary, smaller ring resonator coupled to the primary ring resonator through a partially transmissive reflector 50, which acts as a reflector common to both ring resonators. The secondary ring resonator also includes the reflecting elements 51 and 52, which are bicylindrically curved to effect mode matching between the resonators. The reflecting element 52 is mounted upon a piezoelectric control element 53, which is provided with electrodes 54 and 55 connected across a control voltage source 56.

In operation, for any given length $L_2$ of the external cavity, the reflectivity of the mirror 50 within the primary cavity is highest for one frequency and lower for others; and the most strongly reflected wavelength can be varied by varying $L_2$. Thus, the secondary ring resonator contributes a tunable dispersive loss to the primary ring resonator.

Moreover, the frequency selectivity provided by the secondary resonator enhances that of the primary resonator. It should be noted that, since the pathlength $L_2$ within the secondary resonator is much smaller than the pathlength $L_1$ in the primary resonator, its free spectral range $C/L_2$ is much larger than that, $C/L_1$, of the primary resonator.

In other respects, the principles of operation of the embodiment of FIG. 2 are similar to those described above for the embodiment of FIG. 1.

A still further tunable dispersive loss mechanism and arrangement in laser apparatus according to the invention is illustrated in FIG. 4. A prism 61 provides total internal reflection at a dielectric-air interface at angles very close to the critical angle for a preferred range of frequencies and transmits other frequencies wholly or partly out of the optical ring resonator.

Moreover, by constructing the prism of a nonlinear optical medium such as potassium dihydrogen phosphate (KDP) its refractive index and wavelength range for internal reflection can be varied by an applied voltage. Thus, its effective transmittance versus wavelength characteristic can be varied to switch the direction of unidirectional traveling wave propagation. The principles of operation are similar to those described above for the embodiment of FIG. 1.

Another type of unidirectional ring laser is disclosed in the concurrently filed application of W. W. Rigrod, Ser. No. 465,135, assigned to the assignee hereof.

The above-described arrangements are illustrative of a small number of the many possible specific embodiments that can represent applications of the principles of the invention. Numerous and varied other arrangements can readily be devised in accordance with these principles by those skilled in the art without departing from the spirit and scope of the invention.

What is claimed is:

1. Apparatus adapted for the stimulated emission of radiation, comprising an optical ring resonator, active means disposed in said ring resonator to support stimulated emission radiations propagating in different directions around said ring resonator, means for exciting said material to enable said radiations, said resonator, active means, and exciting means being adapted to provide gain characteristics that are anisotropic with respect to said different directions, and tunable loss means disposed in said ring resonator and provided with sufficient disperson to promote propagation of a unidirectional traveling wave in said ring resonator.

2. Apparatus adapted for the stimulated emission of radiation, comprising an optical ring resonator, active means disposed in said resonator to support stimulated emission radiations propagating in different directions around said ring resonator, means for exciting said material to enable said radiations, said resonator, active means, and exciting means being adapted to favor different frequencies of said radiations in the respective different directions, and tunable dispersive loss means disposed in said resonator and adapted to transmit one of said radiations more strongly than the other.

3. Apparatus adapted for the stimulated emission of radiation, comprising a ring resonator having a plurality of reflectors disposed to reflect said beam at oblique incidence within a closed optical path, anisotropic active means disposed within said ring resonator to support radiations propagating within said closed path, means for exciting said material to enable said radiations, and tunable dispersive loss means disposed in said resonator and tuned to favor radiations propagating in either direction alone around said closed path.

4. Apparatus according to claim 3 in which the tunable dispersive loss means comprises a parallelepiped of dispersive material interposed at oblique incidence and adapted to transmit said radiations.

5. Apparatus according to claim 3 in which the tunable dispersive loss means comprises a prism disposed in the closed path and apertured means cascaded with the prism in the resonator and disposed in said closed path.

6. Apparatus according to claim 3 in which the tunable dispersive loss means comprises a second ring resonator coupled to the aforesaid ring resonator and provided with a tunable free spectral range larger than the free spectral range of the first ring resonator.

7. Apparatus according to claim 3 in which the tunable dispersive loss means comprises an internal reflection prism adopted to reflect the favored radiation internally within the closed path, said prism having a critical angle appropriate to direct out of said closed path different-frequency radiation tending to propagate in the opposite direction.

8. Apparatus according to claim 1 in which the loss means is electronically tunable.

No references cited.

JEWELL H. PEDERSEN, *Primary Examiner.*

B. LACOMIS, *Assistant Examiner.*